N. A. CHRISTENSEN.
MOTOR COMPRESSOR.
APPLICATION FILED MAR. 19, 1917.
1,369,618.
Patented Feb. 22, 1921.
4 SHEETS—SHEET 1.
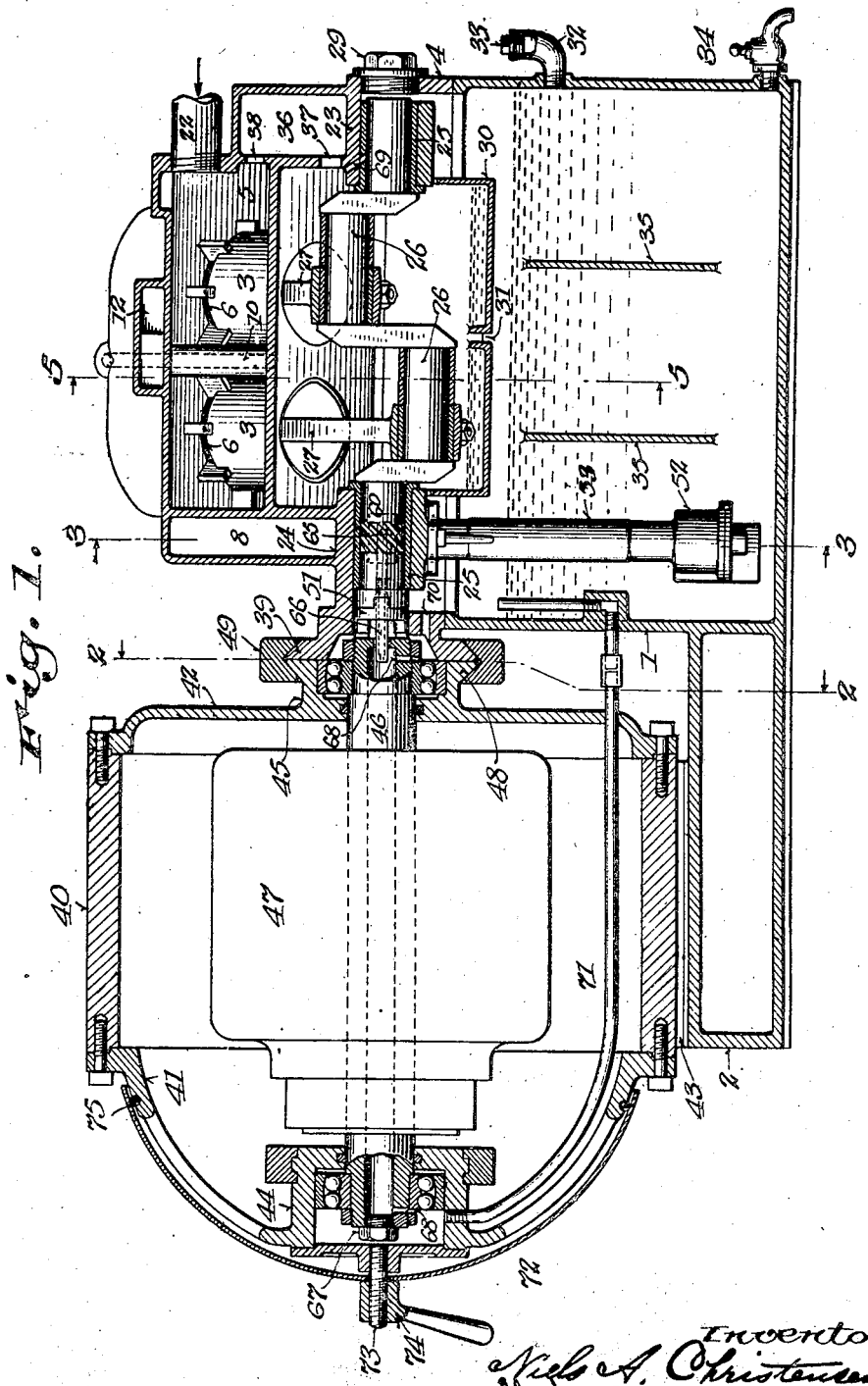

N. A. CHRISTENSEN.
MOTOR COMPRESSOR.
APPLICATION FILED MAR. 19, 1917.
1,369,618.
Patented Feb. 22, 1921.
4 SHEETS—SHEET 2.
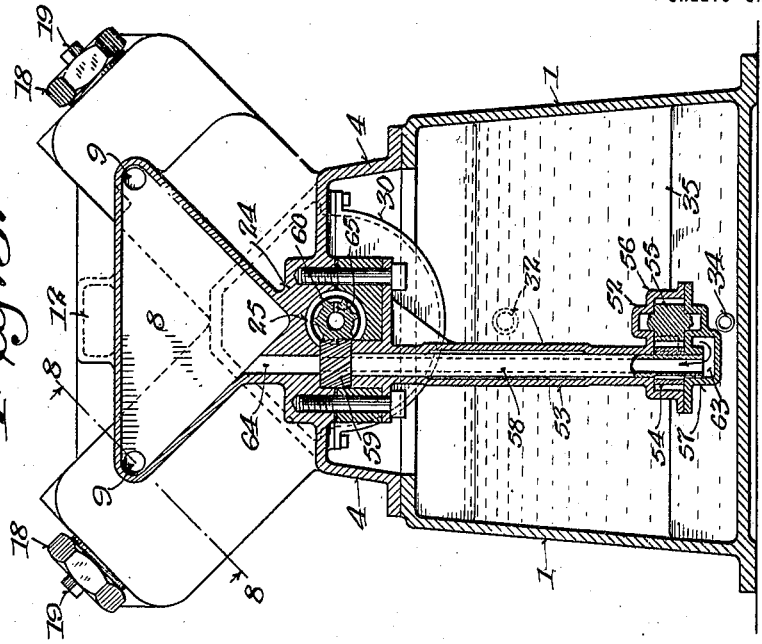
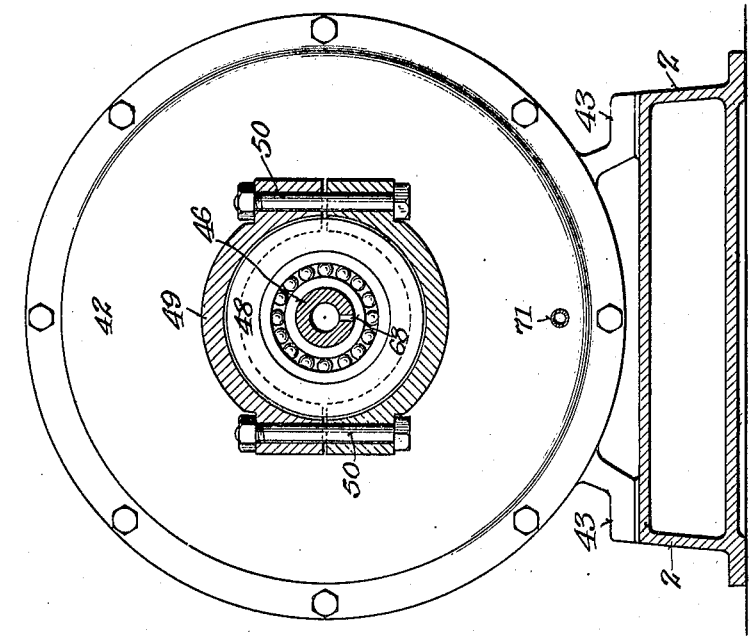

N. A. CHRISTENSEN.
MOTOR COMPRESSOR.
APPLICATION FILED MAR. 19, 1917.
1,369,618.
Patented Feb. 22, 1921.
4 SHEETS—SHEET 4.
Fig. 6.
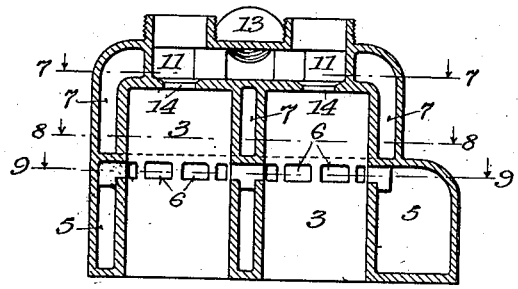
Fig. 10.
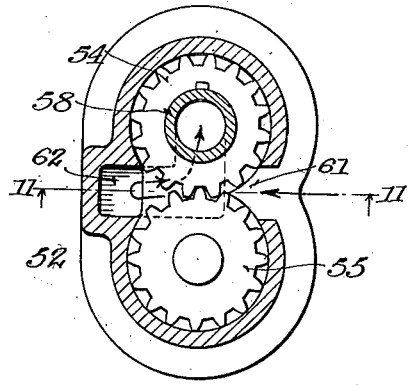
Fig. 7.
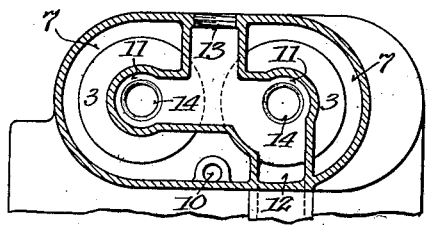
Fig. 11.
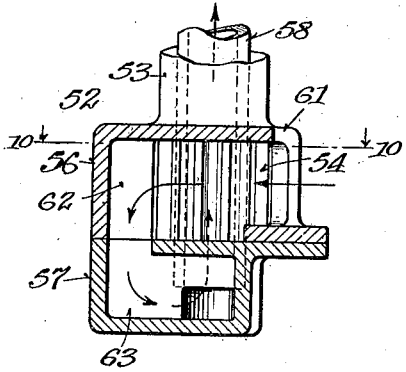
Fig. 8.
Fig. 9.
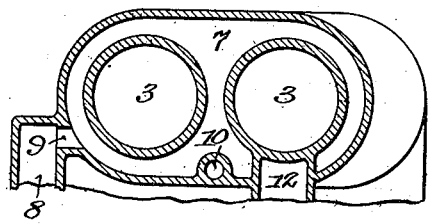
Fig. 12.
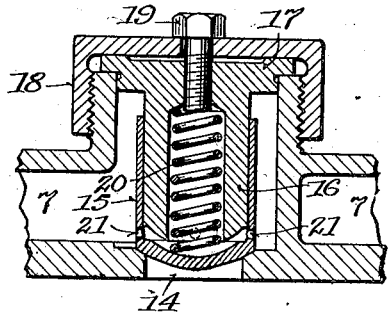
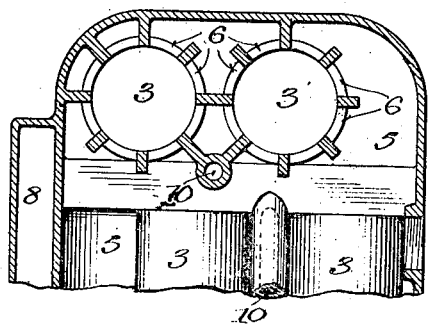
Inventor
Niels A. Christensen,
By Bauduit Bethun Jauncey Bethun
Attorneys.

UNITED STATES PATENT OFFICE.

NIELS A. CHRISTENSEN, OF MILWAUKEE, WISCONSIN.

MOTOR-COMPRESSOR.

1,369,618.  Specification of Letters Patent.  Patented Feb. 22, 1921.

Application filed March 19, 1917. Serial No. 155,675.

*To all whom it may concern:*

Be it known that I, NIELS A. CHRISTENSEN, a citizen of the United States, residing at Milwaukee, in the county of Milwaukee and State of Wisconsin, have invented certain new and useful Improvements in Motor-Compressors, of which the following is a specification, reference being had to the accompanying drawing, forming a part thereof.

This invention relates more particularly to a combined electric motor and air compressor forming a unitary structure in which the crank shaft of the compressor is arranged in axial alinement and directly connected with the armature shaft of the motor, and designed specially for air brake service on railway cars, although it is adapted to and may be used for other purposes.

The main objects of the invention are to produce self-contained compact apparatus which can be easily installed, will be reliable in operation and will require the least possible care and attention; to effectively protect the mechanism against dust, dirt, rain and snow, especially when the apparatus is installed and used in exposed positions, as underneath railway cars; to provide effective and adequate lubrication and cooling of the mechanism; and generally to simplify and improve the construction and operation of apparatus of this class.

The invention consists in the construction, arrangement and combination of parts as hereinafter particularly described and pointed out in the claims.

In the accompanying drawing like characters designate the same parts in the several figures.

Figure 4:
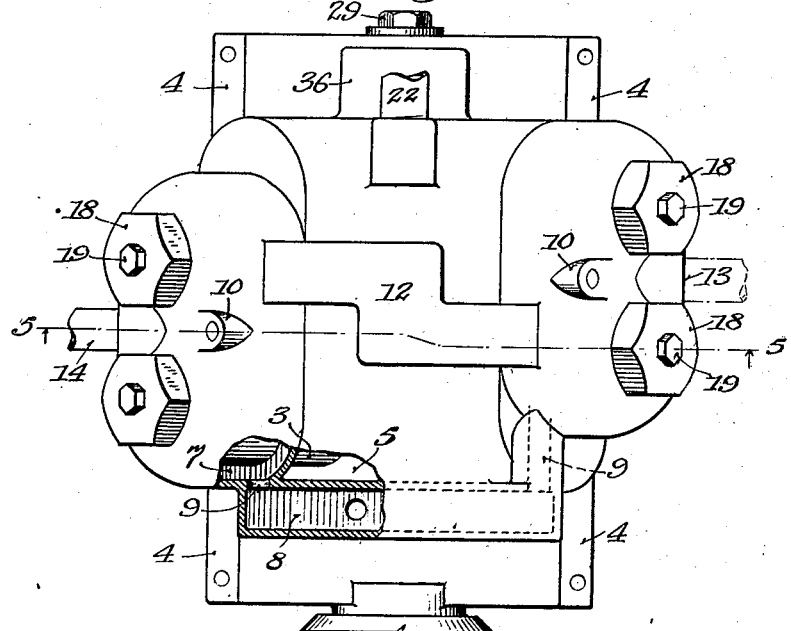
Figure 5:
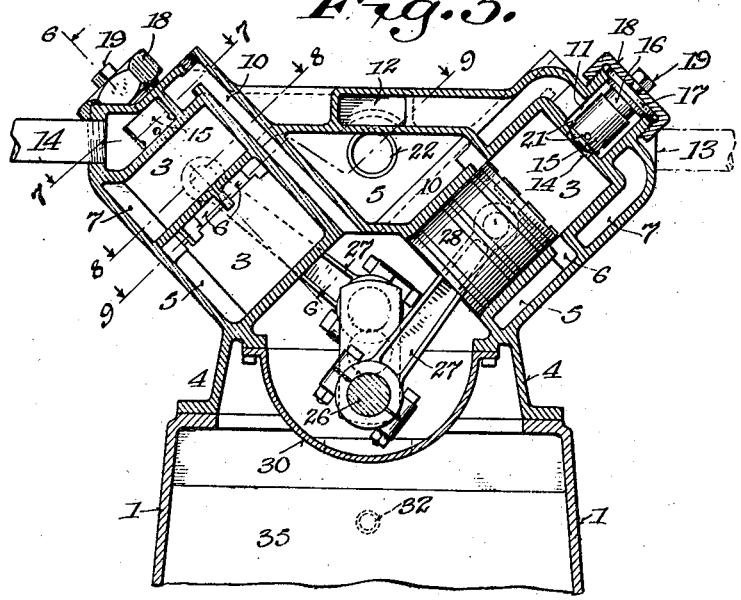

Figure 1 is a vertical longitudinal section of a motor compressor embodying the invention: Figs. 2 and 3 are vertical cross sections on the lines 2—2 and 3—3 respectively, Fig. 1; Fig. 4 is a plan view of the compressor, a portion being broken away; Fig. 5 is a vertical cross section of the compressor on the line 5—5, Fig. 1; Fig. 6 is a longitudinal section on the line 6—6, Fig. 5, of a pair of compressor cylinders; Figs. 7, 8 and 9 are cross sections on the lines 7—7, 8—8 and 9—9 respectively, Fig. 5, the plane of the section of Fig. 8 being also indicated by the line 8—8, Fig. 3; Fig. 10 is an enlarged horizontal section on the line 10—10, Fig. 11, of the oil pump; Fig. 11 is a vertical section thereof on the line 11—11, Fig. 10; and Fig. 12 is an enlarged sectional view of one of the compressor discharge valves.

The apparatus comprises an oil reservoir 1, open and inwardly flanged at the top on which the compressor is mounted as hereinafter explained, and formed at one end with an extension 2, on which the motor is mounted and supported in proper relation to the compressor, as shown in Fig. 1. The compressor, which has two or more, in the present case four, cylinders 3, arranged in upwardly diverging pairs with their axes in planes intersecting the axis of the crank shaft, is cast integrally with a hollow outwardly flanged base 4, which is fitted and bolted to the inwardly flanged top of the reservoir 1, a sufficiently tight joint being formed by coating the contiguous faces of the castings with shellac. The cylinders, which open at their lower ends into a crank chamber formed in the base 4, are cast integrally with a large air inlet chamber 5, between and extending around the lower portions of the cylinders and communicating with inlet ports 6 about midway between the ends of the cylinders, as shown in Figs. 1, 5, 6 and 9. Above the inlet ports 6 the cylinders are cast with jackets forming oil circulating chambers or spaces 7, as shown in Figs. 5, 6, 7 and 8, and at one end of the compressor an oil chamber 8 is formed, which communicates through openings 9 with the oil chambers or spaces 7, as shown in Figs. 3 and 4. From the upper parts of the chambers or spaces 7, overflow passages 10, cast integrally with the cylinders, lead downwardly into the crank case, as shown in Figs. 5, 7, 8 and 9.

The cylinders are cast integrally at their upper closed ends with valve chambers 11, which in the present case are connnected in pairs on opposite sides of the compressor, as shown in Figs. 6 and 7, the two pairs of chambers being connected with each other by a passage 12 extending across and cast with the top of the chamber 5, as shown in Figs. 1, 4 and 5. Each pair of chambers 11 is formed with an outlet passage or opening 13, with which a discharge pipe 14 may be connected on either side of the compressor, as shown in Figs. 5, 6 and 7, the discharge opening which is not used, being closed with a plug.

The chambers 11 communicate with the cylinders 3 through ports 14, which are formed in the cylinder heads and are normally closed by spring seated discharge valves 15, as shown in Figs. 5 and 12. These valves, which are preferably made of cold drawn steel, are of cup shape, and are fitted on internal guides 16, formed at their upper ends with flanged heads 17, which are fitted in the openings into the valve chambers and are clamped and held in place therein by screw caps 18, threaded on upstanding necks or flanges around said openings, as shown in Figs. 5 and 12. The guides 16 are connected and removable with the caps 18 by means of screws 19, passing loosely through openings in the caps and threaded in the upper ends of the guides. The guides are formed with sockets to receive springs 20, by which the valves 15 are closed and normally held against their seats. The valves are formed, as shown in Fig. 12, with lateral openings 21 next to their closed ends, to permit air to pass freely into and out of the space between the lower ends of the guides and the closed ends of the valves, and thus allow the valves, which have a working fit on the guides, to open and close freely and promptly.

The construction and arrangement of the valves and associated parts as shown and described, prevents the deposit of carbon or foreign matter on the outside of the valves near their seats from interfering with their proper operation and removal, as when they are guided on the outside in the valve chambers or housings in the usual way. The springs by which the valves are closed are housed and protected and prevented in case of breakage from causing trouble.

The air inlet chamber 5 is formed at one end, as shown in Figs. 1 and 5, with an inlet opening with which a pipe 22 may be connected when the machine is used for air brake service on railway cars, for taking air from inside the cars or other places where it is free from dust and dirt.

Some distance above the joint between the oil reservoir 1 and the compressor base 4, the compressor casing is provided with crank shaft bearings 23 and 24, the upper halves of which are cast integrally with the casing and the lower halves of which are removably fastened thereto by bolts, as shown in Fig. 3.

These bearings are preferably lined with flanged sleeves or bushings 25, of bronze or other suitable alloy or metal.

The crank shaft having in the present case two double cranks 26, directly connected by rods 27 with the pistons 28 above and on opposite sides thereof, is mounted in the bearings 23 and 24 entirely within the compressor casing and some distance above the top of the oil reservoir 1. Access is had to the bearing 23 and the journal of the crank shaft at that end of the compressor, through an opening formed in the base 4 of the compressor casing, and provided with a screw plug or removable closure 29, as shown in Figs. 1 and 4.

An oil pan 30, preferably of semi-cylindrical form corresponding with the circular path traversed by the cranks 26, is bolted or otherwise fastened to the compressor base 4 below the crank shaft, and is formed with an overflow opening 31, for maintaining at a predetermined level a small body of oil, into which the connecting rods 27 will dip at their lower ends when the compressor is in operation, and thereby splash the oil into the cylinders 3 above, for lubricating the pistons and other working parts of the compressor.

The reservoir 1 has at one end a funnel or spout 32, provided with a screw plug or cap 33, for filling it to a certain level some distance below the pan 30, as shown in Fig. 1. It also has a drain cock 34 at or near the bottom, for drawing off the oil, which should be occasionally renewed or replaced by fresh oil.

The reservoir is preferably formed, especially for air brake service on cars, with transverse baffle plates 35, as shown in Figs. 1 and 3 to prevent or counteract the surging of the oil above the top of the reservoir when the car on which the motor compressor is mounted is stopped and started.

At the end opposite the oil chamber 8 the compressor casing is formed with an air vent chamber 36, the lower part of which communicates through a small opening 37, with the crank chamber, and the upper part of which communicates through a smaller opening 38, with the air inlet chamber 5, as shown in Fig. 1, for relieving the crank chamber of back pressure and separating any oil from the air with which it may be carried into said chamber 36.

On account of the large volume of air contained in the upper part of the oil reservoir 1 and the base of the compressor, fluctuations of pressure in the crank case due to the normal action of the compressor pistons are comparatively small, and hence the pulsations of air from the crank chamber through the vent opening 37 into the chamber 36 will be light and insufficient to carry any considerable quantity of oil into the vent chamber 36. Whatever oil may be carried with the air into the chamber 36 will be precipitated therein and drained back through the vent opening 37, or an opening below it, into the reservoir 1.

The bearing 24 is extended and terminates beyond the base 4 of the compressor casing, in a beveled circular flange 39, as shown in Figs. 1 and 4.

The motor, which may be either of the direct or alternating current type, comprises a casing which may be conveniently made in three main sections, a substantially cylindrical middle section 40, and end plates or sections 41 and 42. The middle section 40, is formed with base flanges 43, which are fitted and bolted or otherwise fastened to the top of the extension 2 on the reservoir 1, as shown in Figs. 1 and 2.

The end sections 41 and 42 are formed or provided with central housings 44 and 45, for ball bearings in which the shaft 46 of the motor armature 47 is mounted. The housing 45 terminates in a beveled circular flange 48, corresponding with the flange 39 on the compressor casing, but beveled in the opposite direction. These flanges are accurately faced and fastened together with the crank shaft bearings 23 and 24, in axial alinement with the ball bearings of the armature shaft 46, by a clamping ring 49, formed with an internal V-groove fitting the beveled faces of the flanges 39 and 48. The ring 49 is made in two halves which are connected with each other and drawn tightly into place on the beveled flanges by bolts 50. The adjoining faces of the flanges 39 and 48 and clamping ring 49 are shellacked, and the joints between the ring sections are placed horizontally to form a tight joint and prevent leakage of oil between the end faces of the flanges.

The crank shaft of the compressor is connected with the armature shaft 46 of the motor by a self-adjusting coupling 51 of the Oldham type, as shown in Fig. 1, to compensate for misadjustment in the alinement of the shafts or their bearings, and to prevent binding of the shafts in their bearings.

The flanges 39 and 48 when assembled and clamped together by the ring 49, form a protecting housing for the shaft coupling 51.

An oil pump 52 is suspended in the oil reservoir 1 near the bottom thereof from the bearing 24, by a hanger 53, as shown in Figs. 1 and 3. The pump preferably consists, as shown in Figs. 3, 10 and 11, of two intermeshing gears 54 and 55, inclosed by and having bearings in a casing 56, which may be cast integrally with the hanger 53 and provided with a detachable closure or section 57. The gear 54 is fixed on the lower end of a tubular shaft 58 passing upwardly through the hanger 53, which is preferably of tubular form, and provided at its upper end with a spiral gear 59, housed in the bearing 24 and meshing with a spiral gear 60 formed on the crank shaft journal within said bearing. The gears 59 and 60 are proportioned to drive the shaft 58 at a reduced speed, say of about one revolution to two revolutions of the crank shaft. The pump casing 56 is formed with an inlet opening 61 at one side of the gears 54 and 55, and at the opposite side with an outlet port or passage 62, communicating through a registering passage 63 in the closure section 57 with the lower end of the tubular shaft 58. The upper end of the tubular shaft 58 communicates through a vertical passage 64 with the oil chamber 8 and with the chamber for the gears 59 and 60 in the bearing 24. The crank shaft journal in the bearing 24 has an axial bore communicating through a lateral opening 65 through the gear 60 with the interior of said bearing, as shown in Figs. 1 and 3. A tube or nozzle 66, threaded or otherwise fastened in said bore, extends axially therefrom loosely through the coupling member 51 into the adjacent end of the armature shaft 46, which is of tubular construction, as shown in Fig. 1. The bore of the shaft 46 at the end into which the nozzle 66 projects, is contracted and at the opposite end is closed by a screw plug 67, and lateral openings 68 lead from said bore into the ball bearing housings 44 and 45.

An oil hole 69 is formed through the upper part of the bearing 23 and its bushing, as shown in Fig. 1, for lubrication of the adjacent crank shaft journal by oil thrown by the connecting rods 27 from the pan 30 into the crank chamber.

An overflow opening 70 is made below the coupling 51 through the extension of the bearing 24 from the adjacent ball bearing housing, to conduct oil from the ball bearing housing 45 into the reservoir 1, and a pipe 71 leads from the housing 44 at the opposite end of the armature shaft into said reservoir.

The commutator end of the armature 47 is protected against dust, etc., by a shield 72, detachably fastened to the end plate or section 41 by a screw 73 and handle nut 74, a tight joint being made between the shield adjacent to its margin by a packing ring 75 held in a groove formed in the plate or section 41.

In the operation of the motor compressor, clean air entering the chamber 5 through the pipe 22 or an opening in the compressor casing, is drawn through the ports 6 when they are uncovered by the pistons 28, instantly filling the cylinders above the pistons. The ports 6 being arranged in series completely around the several cylinders, as clearly shown in Fig. 9, afford ample opening for the quick admission of air to the cylinders, and they are of such length and location that they will remain open during approximately one-third of the entire angular movement of the cranks 26, and for approximately one-fifth of the stroke or linear movement of the pistons.

The chamber 5 and the spaces around the cylinders with which it communicates being of comparatively large capacity, the inflow of air into said chamber will be substantially uniform and its discharge therefrom into the cylinders practically noiseless.

Upon the upward strokes of the pistons, the air is compressed in the upper ends of the cylinders, opening the valves 15 against the tension of the springs 20, and is discharged through the chambers 11 and connecting passages 12 and 13 into the pipe 14.

During the operation of the compressor, oil is elevated by the pump 52 from the lower part of the reservoir 1 into the chamber 8, from which it passes through the openings 9 into the spaces 7, around the upper ends of the cylinders 3 and valve chambers 11, overflowing through the passages 10 back into the crank case above the pan 30. From the pan 30, which is thus kept replenished to a certain level during the operation of the machine, the oil is thrown by the action of the connecting rods 27, upwardly into the cylinders, thereby thoroughly lubricating the pistons and their actuating connections with the crank shaft, surplus oil overflowing through the opening 31 back into the reservoir 1.

Sufficient oil is supplied by the splash from the pan 30 to thoroughly lubricate the bearing 23 through the hole 69 in the upper part thereof. The other crank shaft bearing 24 is lubricated with oil supplied by the pump 52 through the chamber in which the gears 59 and 60 are inclosed.

The bearings of the armature shaft 46 are lubricated by oil supplied from the pump through the opening 65 in the crank shaft, nozzle 66 and lateral openings 68 from the bore of the armature shaft, the surplus oil being returned from said bearings through the opening 70 and pipe 71 into the reservoir 1. Surplus oil from the crank shaft bearings 23 and 24 flows from the ends of said bearings directly back into the reservoir 1 or into the pan 30.

The constant circulation of fresh air through the chamber 5 and spaces communicating therewith around the lower parts of the cylinders 3, and the constant circulation of oil through the spaces 7 around the upper parts of the cylinders and the discharge valves when the machine is in operation, keeps the cylinders and pistons and the discharge valves cool and in proper working condition.

I claim:

1. In a machine of the class described, the combination with upwardly diverging compressor cylinders having inlet ports intermediate their ends, and a casing inclosing said cylinders and forming an air inlet chamber between and extending around them in communication with said ports and having an inlet communicating with the atmosphere.

2. In a machine of the class described, the combination of upwardly diverging compressor cylinders having inlet ports intermediate their ends, and a casing cast integrally with said cylinders and forming an air inlet chamber between and extending around them in communication with said ports and having an inlet communicating with the atmosphere, and a crank chamber into which the cylinders open at their lower ends.

3. In a machine of the class described, the combination of upwardly diverging compressor cylinders having inlet ports intermediate their ends and discharge ports in their upper heads, and a casing cast integrally with said cylinders and forming an air inlet chamber between and extending around them in communication with the inlet ports and having an inlet communicating with the atmosphere, a crank chamber into which the cylinders open at their lower ends, and interconnected valve chambers in communication with the discharge ports.

4. In a machine of the class described, the combination of a compressor cylinder, and a casing inclosing said cylinder and forming a crank chamber into which the cylinder opens at its lower end, and a separate oil chamber extending around the cylinder above the crank chamber and having an oil supply connection and an overflow opening into the crank chamber.

5. In a machine of the class described, the combination of upwardly diverging compressor cylinders, and a casing forming a closed crank chamber into which the cylinders open at their lower ends, a separate oil supply chamber extending above the crank chamber and oil circulating spaces around the cylinders connected by inlet openings with the supply chamber and by overflow passages with the crank chamber.

6. In a machine of the class described, the combination of an oil reservoir open at the top, a compressor having a casing formed with a crank chamber and base fitted to and closing the top of said reservoir and provided at the ends with crank shaft bearings, cylinders opening at their lower ends in said chamber and inclosed by said casing with oil circulating spaces which are connected by overflow passages with the crank chamber, pistons fitted in said cylinders, a crank shaft mounted in said bearings, rods connecting the crank shaft with the pistons, a pan located below the crank shaft in position to catch oil from said overflow passages and having an overflow opening into the reservoir adapted to maintain oil in the pan at a certain level below which the lower ends of the connecting rods pass in the lower part of their circuit, and a pump adapted to elevate oil from the reservoir into the circulating spaces around the cylinders.

7. In a machine of the class described, the combination of compressor cylinders having inlet ports intermediate their ends, and a casing forming a crank chamber into which the cylinders open at their lower ends, an air inlet chamber extending around the lower parts of the cylinders in communication with the inlet ports, and oil circulating spaces extending around the upper parts of the cylinders and having an oil supply connection and overflow openings into the crank chamber.

8. In a machine of the class described, the combination of upwardly diverging compressor cylinders closed at their upper ends and provided with discharge ports and valves, and a casing forming a crank chamber into which the cylinders open at their lower ends, an air inlet chamber between and extending around the lower parts of the cylinders, intercommunicating chambers for the discharge ports and valves, and oil circulating spaces extending around the upper parts of the cylinders and discharge valve chambers and having overflow openings into the crank chamber.

9. In a machine of the class described, the combination of an oil reservoir open at the top, upwardly diverging compressor cylinders having inlet ports intermediate their ends and discharge ports in their upper ends, a casing formed with a crank chamber and base fitted to and closing the top of the reservoir, an air inlet chamber between and around the lower parts of the cylinders in communication with their inlet ports, an oil chamber, and circulating spaces around the upper parts of the cylinders having inlet openings from said oil chamber and overflow openings into the crank chamber; and a pump for elevating oil from the reservoir into said oil chamber.

10. In a machine of the class described, the combination of an oil reservoir open at the top, upwardly diverging compressor cylinders having inlet ports intermediate their ends and discharge ports in their upper ends; a casing formed with a crank chamber and base into which the cylinders open at their lower ends and which is fitted to and closes the top of the reservoir, an air inlet chamber between and around the lower parts of the cylinders in communication with said inlet ports, an oil chamber, and circulating spaces around the upper parts of the cylinders having inlet openings from said oil chamber and overflow openings into the crank chamber; a pump for elevating oil from the reservoir into said oil chamber; a crank shaft mounted in bearings within said casing above said reservoir, pistons fitted in said cylinders, rods directly connecting the crank shaft with the pistons, a pan located below and in the path of the lower ends of the connecting rods in position to catch oil from said overflow openings and having an overflow opening adapted to maintain oil at a certain level in the pan; and a pump for elevating oil from the reservoir into said oil chamber.

11. In a machine of the class described, the combination of compressor cylinders having inlet ports intermediate their ends, an air chamber communicating with said inlet ports and having an inlet opening in communication with the atmosphere, a closed crank chamber, and a vent chamber communicating through an opening with the crank chamber and through another opening with said air chamber.

12. In a machine of the class described, the combination of an oil reservoir having an extension at one end, a compressor having a casing mounted upon and closing the top of said reservoir and provided at the ends with bearings, a crank shaft mounted in said bearings and having an oil passage through one of its journals, a motor having a casing mounted on the extension of the oil reservoir and having bearings in substantial axial alinement with said crank-shaft bearings, a tubular motor shaft mounted in the bearings of said motor casing and coupled end to end with the crank-shaft journal having the oil passage, a pump for elevating oil from said reservoir into the bearing of the crank-shaft journal having the oil passage, and return oil conduits leading from the motor shaft bearings into said reservoir.

13. In a machine of the class described, the combination of a supporting member, compressor and motor casings mounted on said member and provided with alined shaft bearings and with beveled circular flanges coaxial with adjacent bearings, a contractible clamping ring having an internal V-groove fitting over said flanges and binding them together, compressor and motor shafts mounted in said bearings, and a self-adjusting coupling connecting said shafts end to end, the flanges forming a housing for the shaft coupling.

14. In a machine of the class described, the combination of a supporting member and oil reservoir, compressor and motor casings mounted on said supporting member and oil reservoir and provided with alined shaft bearings and at adjoining ends with corresponding beveled circular coupling flanges coaxial with the adjacent bearings, a contractible clamping ring having an internal V-groove fitting over said flanges and binding them together, a crank shaft mounted in the bearings of the compressor casing and having an axial oil passage in the end next to the motor, a tubular motor shaft mounted in the bearings of the motor casing and having a contracted opening at one end in alinement with the oil passage in the crank shaft, a self-adjusting coupling connecting said shafts end to end, a nozzle extending from the oil passage in the crank shaft through said coupling into the motor shaft at the end with the contracted opening, a pump for elevating oil from the reservoir into the passage in the crank shaft, and return oil conduits from the motor shaft bearings into the reservoir.

In witness whereof I hereto affix my signature.

NIELS A. CHRISTENSEN.